Sept. 22, 1964 F. C. HALLDEN ETAL 3,150,324

INTERLEAVED DELAY LINE WITH RECIRCULATING LOOPS
FOR PERMITTING CONTINUOUS STORAGE
AND DESIRED DELAY TIME

Filed Feb. 3, 1961 2 Sheets-Sheet 1

INVENTORS
FREDERICK C. HALLDEN
CURTIS H. RICHMOND
BY
ATTORNEYS

Sept. 22, 1964 F. C. HALLDEN ETAL 3,150,324

INTERLEAVED DELAY LINE WITH RECIRCULATING LOOPS FOR PERMITTING CONTINUOUS STORAGE AND DESIRED DELAY TIME

Filed Feb. 3, 1961 2 Sheets-Sheet 2

INVENTORS
FREDERICK C. HALLDEN
CURTIS H. RICHMOND
BY
Pennie Edmonds Morton Barrows & Taylor
ATTORNEYS

United States Patent Office 3,150,324
Patented Sept. 22, 1964

3,150,324

INTERLEAVED DELAY LINE WITH RECIRCULATING LOOPS FOR PERMITTING CONTINUOUS STORAGE AND DESIRED DELAY TIME

Frederick C. Hallden, Huntington, and Curtis H. Richmond, Plainview, N.Y., assignors to Cutler-Hammer, Inc., Milwaukee, Wis., a corporation of Delaware Filed Feb. 3, 1961, Ser. No. 86,996
6 Claims. (Cl. 328—56)

This invention relates to delay lines, and particularly to a delay line arranged in a loop in which pulses are recirculated.

Delay lines are frequently employed in signal pulse systems to produce desired delays. For long delays they become quite expensive, and it may be necessary to cascade a number of shorter delay lines to obtain the desired overall delay. Since attenuation increases with the delay, considerable amplification may be required. On the other hand, the band width of available delay lines may be considerably greater than that required for the particular application.

In a system described in copending patent application Serial No. 87,037, filed February 3, 1961 by Hallden et al. for "Data Accumulation Systems," a recirculating storage loop with a delay time of the order of 35,000 microseconds was desired. It was also desired to alter the overall delay time periodically, and to modify previously stored signals.

The present invention is directed to increasing the overall delay provided by a delay line of given length, without undue additional expense.

In accordance with the invention, the delay line is arranged in a recirculating loop, thereby permitting both delay and continuous storage, as desired. The recirculation is divided into a plurality of phases, and the pulses recirculate in successive phases until they arrive in the initial phase, or some other predetermined phase, whereupon they may be extracted. Or, by introducing a delay or advance (depending on the direction of progression through the several phases) they may continue to be recirculated as long as desired. Thus, storage of the signals for considerable lengths of time is possible.

Delay lines of various types may be employed in accordance with the requirements of a particular application. In the specific embodiment here described, ultrasonic delay lines are employed since they are capable of giving substantial delays and have a sufficient bandwidth to yield adequate fidelity in the signal pulses issuing therefrom.

Figure 1:
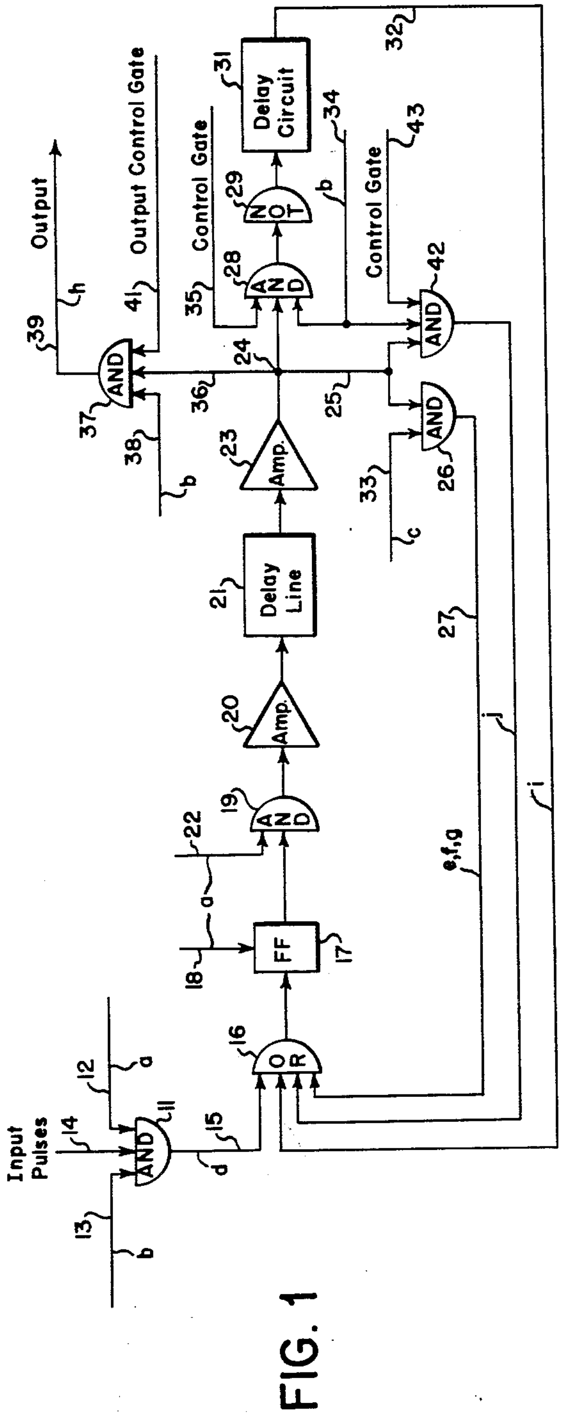
FIG. 1 shows an interleaved delay line in accordance with the invention, with provision for advancing pulses in the overall loop cycle.

In the drawings, semicircular symbols with the terms "AND," "OR" and "NOT" are used. These are conventional components well known in the computer field. As used herein, an "AND" is a gate or circuit which gives an output only when all inputs are present. An "OR" is a circuit which gives an output when any one or all input signals are present. In both cases the output polarity is here assumed to be the inverse of the input polarity. A "NOT" is a circuit which is essentialy an inverter; that is, an input of one polarity will give an output of the opposite polarity.

Another symbol employed is a box with "FF" therein. This designates a bistable multi-vibrator or "flip-flop" unit which is well known in the art. It commonly contains input circuits for setting the flip-flop to one condition, and for resetting it to the opposite condition. Outputs of either polarity may be obtained from the stages in the multi-vibrator, for either condition of operation.

Before the description of the specific circuits is given, reference will be made to the waveforms of FIG. 3.

Figure 3:
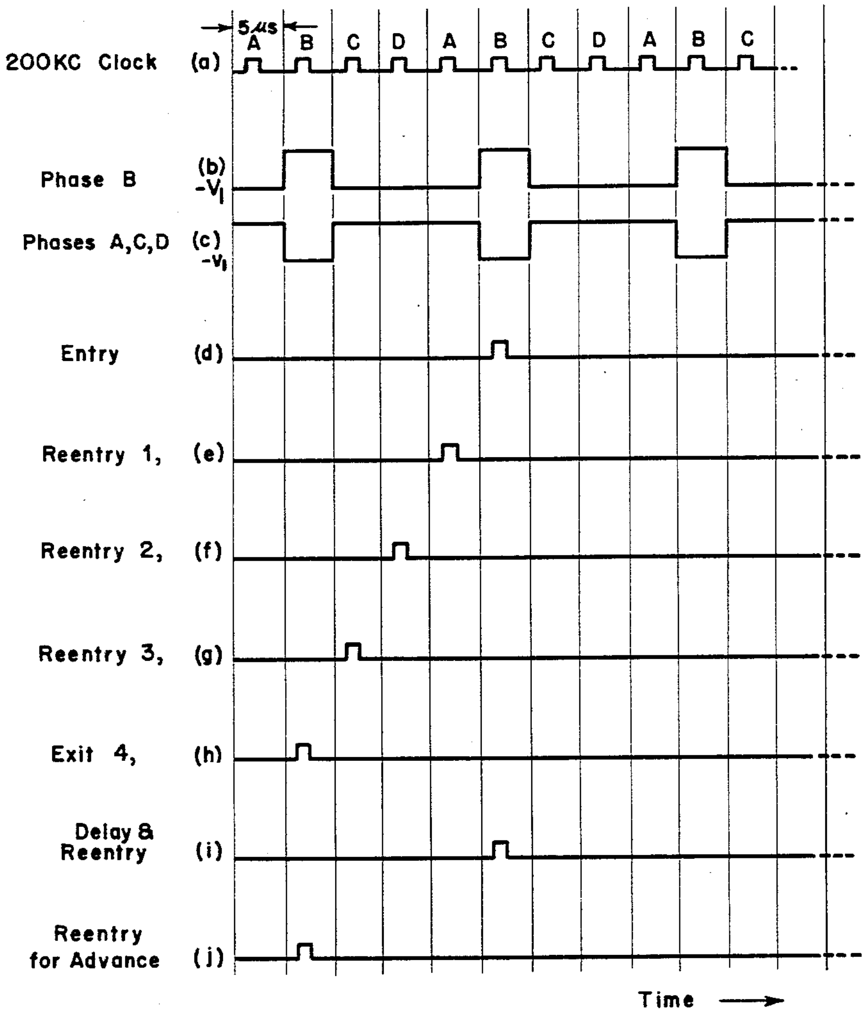
FIG. 3 shows illustrative waveforms.

At (*a*) of FIG. 3 is shown a series of gating or "clock" pulses which recur in successive time phases A, B, C and D. In this specific embodiment quadruple interleaving is employed, this requiring four interleaved phases in a phase cycle as shown. It is possible to use fewer or more phases if desired. The clock pulses may be of any suitable length and periodicity. In this embodiment they were 1 to 2 microseconds long, and each phase lasted for five microseconds.

Signals may be entered into the loop storage system in any of the four phases, as desired. It is here assumed that they enter in phase B. Suitable gating waves are shown at (*b*) and (*c*). The first occurs during phase B, and the second during phases A, C and D. Wave (*c*) is the inverse of wave (*b*) and may be obtained by the use of an inverting circuit, or the waves may be obtained from different stages in a multivibrator used to produce the gate waves, etc. In the components actually used herein, the positive pulses went to ground from a negative reference value, and accordingly —V is shown for the waves. The remainder of FIG. 3 shows the manner in which signal pulses are entered and recirculated in the several phases, and these will be referred to later.

Referring to FIG. 1, an input AND gate 11 is supplied with clock pulses (*a*) through line 12, and a phase B gate through line 13. Here and elsewhere in the drawings, lower case letters are shown adjacent selected lines to indicate that those lines normally carry signals of the waveforms shown by corresponding lower case letters in FIG. 3.

Input pulses in line 14 are gated by the clock and phase B pulses so that they occur in line 15 as short signal pulses in phase B, as shown for example at (*d*) on FIG. 3. The input pulses may be long or short depending upon the particular application. They will normally be longer than the clock pulses and may extend over several or many phase intervals, in which case successive signal pulses will occur in line 15 during the phase B intervals.

The signals in line 15 are supplied through OR 16 to FF17 to set the latter. It is assumed that the initial pulses in lines 12–14 are positive, thus giving negative pulses in line 15 which are inverted in OR 16 to supply corresponding positive pulses to set FF17. OR 16 also provides desirable isolation.

FF17 is reset by clock pulses in reset line 18, and the output thereof is supplied through AND 19 and a drive amplifier 20 to delay line 21. Clock pulses may also be supplied to AND 19 through line 22. FF17 and AND 19 function primarily to insure that pulses of suitable length and proper timing are supplied to the delay line. This is unnecessary for input pulses from line 15, but is useful to reform recirculating pulses. The exact phasing of the clock pulses in lines 18 and 22 may be selected to take into account small phase shifts occurring in various parts of the system.

Amplifier 20 provides pulses of sufficient energy to drive delay line 21. This line is here an ultrasonic delay line, but in other applications may be of a different type. After traveling through the delay line and another amplifier 23, the initially entered signal pulses arrive at point 24 with a delay determined by the delay line 21 and the small delays in the other components.

Two principal recirculating loops are shown. The first is through line 25, AND 26 and line 27 back to OR 16. The second is through AND 28, NOT 29, delay circuit 31 and line 32 back to OR 16. The successive recirculations may take place in either loop, depending on whether the phase of the pulses is advanced or retarded in the recirculation. For convenience, a complete recirculation cycle during which a pulse entering in a given phase is recirculated until it again enters in that phase may be termined an "orbit." In this embodiment, the pulses are advanced during successive recirculations within an orbit, and the inner loop 27 is operative during phases A, D and C.

The total delay for one passage around the inner loop 27 is chosen so that pulses initially in phase B reenter OR 16 in phase A, as shown at (*e*) of FIG. 3. On successive recirculations, these pulses will reenter OR 16 in phases D and C, as shown at (*f*) and (*g*).

Inner loop 27 is closed to signals in phase B by applying the phase A, C, D gate (FIG. 3*c*) to AND 26 through line 33. However, phase B signals at point 24 are allowed to pass through AND 28 to the outer loop 32 by the application of a phase B gate to AND 28 through line 34. This recirculation through the outer loop may be inhibited or permitted by a control gate applied to line 35.

If allowed to pass through AND 28, the pulses are inverted by NOT 29 and applied to delay circuit 31. This delay circuit is designed to provide the necessary additional delay to cause signal pulses in phase B to reenter OR 16 in their original time position in the orbit.

An example will aid in uederstanding the operation. In one application it was desired to have an orbit normally lasting 34,800 microseconds. One-fourth of this is 8,700 microseconds, the average delay per cycle required with four recirculating cycles wherein pulses pass through successive cycles in four different phases until the desired total delay of 34,800 microseconds is obtained. Inasmuch as pulses may exist in delay line 21 in any of the four phases, and those in one phase are interleaved with those in another, the specific embodiment shown in FIG. 1 may be termined a "quadruple interleaved" system. It was desired to be able to enter new signals at 20-microsecond intervals. Accordingly, each phase lasted for 5 microseconds, so that phase B would recur at 20-microsecond intervals. The overall delay for one circulation around the inner loop 27 was made 8,695 microseconds. Delay circuit 31 was arranged to give an additional delay of 20 microseconds around the outer loop. Thus, the complete interleaved cycle was the desired 34,800 microseconds, and after a complete cycle a signal pulse would have the same time relationship in that cycle that it had initially.

Delay circuit 31 could be a short delay line tailored to provide the proper delay. However, it is more convenient to employ an FF unit, or a pair of FF units with suitable setting and resetting to provide the proper delay, as is known in the art.

An output circuit is provided through line 36 to AND 37. A phase B gate is supplied through line 38 so that pulses can pass to output line 39 only during phase B intervals, giving overall delays of approximately one or more orbits. That is, outputs can occur at approximate multiples of the orbit duration, including one. The exact values for the specific embodiment shown will be described in connection with FIG. 3. An output control gate may be applied through line 41 to open AND 37 only when it is desired to extract information. Control gate 35 may be arranged to close AND 28 when AND 37 is opened, so as to prevent recirculation of pulses which have passed to output line 39.

In this embodiment it was also desired to periodically advance pulses in the orbit. To this end, AND 42 is supplied with signals from point 24 and with the phase B gate so that phase B signals can pass therethrough under the control of a gate applied to 43. If the gate at 43 is open and that at 35 is closed, phase B pulses will now be supplied to the input OR 16 without the additional delay in 31, and consequently will be recirculated in the next phase B time interval.

The operation is illustrated in FIG. 3. A pulse initially entered at (*d*) in phase B will reenter in phase A, as shown at (*e*), after one passage through the delay line 21. It is impractical to show the overall delay on this time scale. Subsequently, it will reenter in phase D as shown at (*f*) and then in phase C, as shown at (*g*). After the third reentry, it will appear at point 24 in phase B, and will then pass to output line 39 unless the output control gate 41 is closed. This is shown at (*h*).

At this time the signal in phase B will pass through delay circuit 31 unless inhibited by control gate 35, and will reenter OR 16 as shown at (*i*). It will thus have the same time relationship in the complete orbit cycle that it did upon entry, but it will have been delayed by the duration of the complete orbit cycle.

Summarizing the operation, if an input pulse in phase B in line 15 is passed to output line 39 when it first occurs at point 24 in phase B, the overall delay will be one complete orbit minus the duration of one phase cycle (four phase intervals=20 microseconds), as will be apparent by comparing FIG. 3(*d*) with 3(*h*). If, however, it is to be stored for one or more additional orbits, without changing its position in the orbits, each time it arrives at point 24 in phase B it will pass through the outer loop 32 and be delayed one phase cycle (20 microseconds) so that it reenters the delay line in phase B exactly one or more orbits after its initial entry, as shown in FIG. 3(*i*). Thus a series of pulses can be stored for an indefinite length of time without changing their time position within the orbit, and hence without changing their significance. If at any time the pulse is to be advanced in the orbit, AND 42 is opened and AND 28 closed, so that the pulse reenters the delay line in phase B one phase cycle ahead of its original entry, as shown in FIG. 3(*j*).

If, when a signal arrives in phase B at point 24, AND 28 is closed and AND 42 opened by the respective control gates, the signal will reenter OR 16, as shown at (*j*). Thus it will have advanced in the complete cycle by four phase durations, which is here 20 microseconds.

It will therefore be observed that the interleaved recirculating arrangement of FIG. 1 quadruples the effective delay of line 21, while enabling the pulses to be transferred out of the system or recirculated, as would be the case for a single delay line of four times the length. Thus a more economical arrangement is provided.

It will be noted that the recirculating loop including AND 26 is parallel with that including AND 42. The two could be combined with appropriate circuitry, but the arrangement shown provides desirable isolation.

Figure 2:
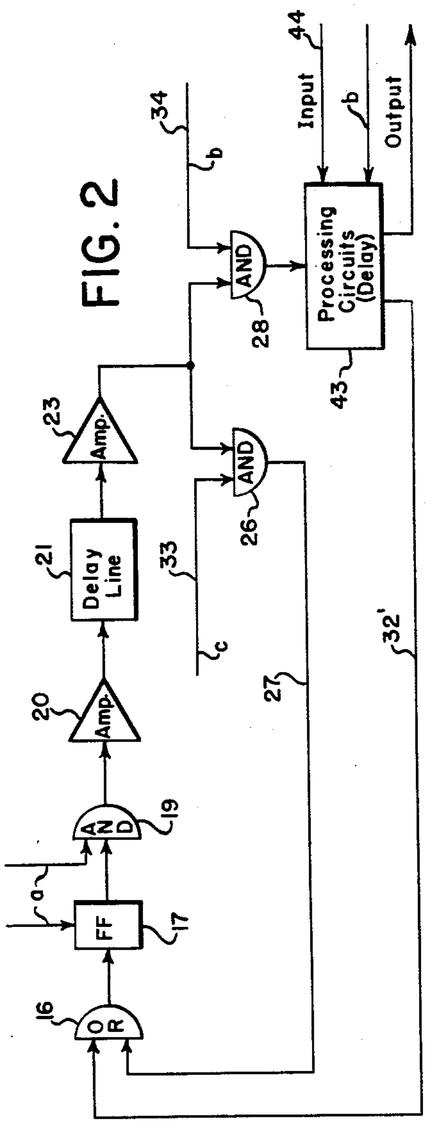
FIG. 2 illustrates an embodiment in which the stored signals are processed to alter their signal content.

FIG. 2 is an embodiment similar to that of FIG. 1, and corresponding parts are given the same numerals and need not be described again. However, the outer circulating loop includes processing circuits 43 which are arranged to provide the delay formerly provided by delay circuit 31.

In this embodiment it was desired to process the stored pulses, and accordingly input signals are applied to 43 through line 44. In the particular embodiment of the aforementioned application the circulating pulses represented numbers in a binary-decimal code, and the processing circuits included a count-shift register which normally passed recirculating pulses therethrough with the proper time delay. However, upon the arrival of a signal in input 44 the coded signal total was increased by 1 and again recirculated.

It is unnecessary to describe the processing circuits in detail since they may include any types of circuits commonly employed with a non-interleaved delay line.

The output may be obtained from the processing circuits, as shown, or an arrangement similar to that shown in FIG. 1 may be employed, etc.

It should be observed that the additional delay provided by delay circuit 31 in FIG. 1, or by the processing circuits 43 in FIG. 2, need not necessarily be designed to return a given phase B signal to the phase B interval in which it originally entered, although this is normally advantageous. If desired, the additional delay may be a multiple of the interval between successive phase B intervals. Also, if occasion requires, the output circuit of FIG. 1 could be gated to extract pulses in other than phase B, thereby lending added flexibility to the system.

It will be understood that any substantial delays in the components in series with the delay line may be considered as part of the delay line.

From the foregoing description it will be apparent that the interleaved delay line arrangement of the present invention is capable of use in many applications where conventional non-interleaved delay lines are employed, with resultant economy.

We claim:

1. An interleaved delay line which comprises a delay line having an input and an output, first and second circuits connecting the output of said delay line with the input thereof to form two recirculating loops, additional delay means in one of said circuits, an input circuit for supplying signals to said delay line, a gate in said input circuit, means for opening said gate only during input phase intervals of predetermined periodicity, the delay around one of said loops being predetermined to cause signal pulses passing therethrough to reenter said delay line out of phase with respect to said input phase intervals for at least one recirculation thereof, a gate in each of said loop circuits, and means for periodically closing the gate in said one loop and opening the gate in said other loop during the occurrence of pulses issuing from said delay line substantially in phase with said input pulse intervals, the delay of said additional delay means being substantially equal to a multiple of the period of said input phase intervals.

2. An interleaved delay line which comprises a delay line having an input and an output, first and second circuits connecting the output of said delay line with the input thereof to form two recirculating loops, additional delay means in one of said circuits, an input circuit for supplying signals to said delay line, a gate in said input circuit, means for opening said gate only during input phase intervals of predetermined periodicity, the delay around one of said loops being predetermined to cause signal pulses passing therethrough to reenter said delay line in interleaved phase relationship with said input phase intervals, a gate in each of said loop circuits, and means for periodically closing the gate in said one loop and opening the gate in said other loop during the occurrence of pulses issuing from said delay line substantially in phase with said input pulse intervals, the delay of said additional delay means being substantially equal to a multiple of the period of said input phase intervals.

3. An interleaved delay line which comprises a delay line having an input and an output, first and second circuits connecting the output of said delay line with the input thereof to form two recirculating loops, additional delay means in one of said circuits, an input circuit for supplying signals to said delay line, a gate in said input circuit, means for opening said gate only during input phase intervals of predetermined periodicity, the delay around one of said loops being predetermined to cause signal pulses passing therethrough to reenter said delay line in a predetermined number $n$ of interleaved phase intervals with respect to said input phase intervals, a gate in each of said loop circuits, and means for closing the gate in said one loop and opening the gate in said other loop during each $n^{th}$ phase interval to recirculate pulses through said other loop for one cycle, the delay of said additional delay means being substantially equal to a multiple of the period of said input phase intervals.

4. Apparatus in accordance with claim 1 including an output circuit connected to one of said recirculating loops, and means for periodically gating said output circuit during a predetermined phase interval.

5. Apparatus in accordance with claim 3 including an output circuit connected to one of said recirculating loops, and means for periodically gating said output circuit during said $n^{th}$ phase interval.

6. Apparatus in accordance with claim 3 including means for closing the gate in said other loop during an $n^{th}$ phase interval, and means for reentering signal pulses from the output of the delay line to the input thereof in the corresponding $n^{th}$ phase interval.

References Cited in the file of this patent

UNITED STATES PATENTS

| | | |
|---|---|---|
| 2,941,152 | Gosslau | June 14, 1960 |
| 2,961,535 | Lanning | Nov. 22, 1960 |

UNITED STATES PATENT OFFICE

CERTIFICATE OF CORRECTION

Patent No. 3,150,324 September 22, 1964

Frederick C. Hallden et al.

It is hereby certified that error appears in the above numbered patent requiring correction and that the said Letters Patent should read as corrected below.

Column 2, line 50, for "drive" read -- driver --; column 3, lines 5 and 36, for "termined", each occurrence, read -- termed --; line 26, for "uederstanding" read -- understanding --; column 4, line 34, beginning with "If, when a signal" strike out all to and including "20 microseconds." in line 38, and insert the same before line 15, same column 4, as a new paragraph.

Signed and sealed this 9th day of February 1965.

(SEAL)
Attest:

ERNEST W. SWIDER
Attesting Officer

EDWARD J. BRENNER
Commissioner of Patents